United States Patent [19]
Gaylord

[11] 3,956,230
[45] May 11, 1976

[54] COMPATIBILIZATION OF HYDROXYL-CONTAINING FILLERS AND THERMOPLASTIC POLYMERS

[75] Inventor: Norman G. Gaylord, New Providence, N.J.

[73] Assignee: Champion International Corporation, New York, N.Y.

[22] Filed: Aug. 21, 1970

[21] Appl. No.: 66,107

Related U.S. Application Data

[63] Continuation-in-part of Ser. No. 702,204, Feb. 1, 1968, Pat. No. 3,645,939.

[52] U.S. Cl. ............................ 260/42.14; 260/37 R; 260/37 SB; 260/37 N; 260/37 AL; 260/37 PC; 260/40 R; 260/42.15; 260/42.16; 260/42.46; 106/308 Q; 106/309; 427/214
[51] Int. Cl.² ........................ C08K 9/04; C08K 9/10
[58] Field of Search ................. 260/41, 41 A, 42.14, 260/42.46

[56] References Cited
UNITED STATES PATENTS

| | | | |
|---|---|---|---|
| 3,160,598 | 12/1964 | Delfosse | 260/23 |
| 3,236,917 | 2/1966 | Natta et al. | 260/878 |
| 3,342,771 | 9/1967 | Cheritat et al. | 260/41 |
| 3,394,100 | 7/1968 | Falcone et al. | 260/41 |
| 3,455,871 | 7/1969 | Coover et al. | 260/41 |
| 3,471,439 | 10/1969 | Bixler et al. | 260/41 |
| 3,503,922 | 3/1970 | Carton | 260/41 |
| 3,519,593 | 7/1970 | Bolger | 260/41 |

FOREIGN PATENTS OR APPLICATIONS

| | | |
|---|---|---|
| 879,587 | 10/1961 | United Kingdom |

*Primary Examiner*—James H. Derrington
*Attorney, Agent, or Firm*—Roylance, Abrams, Berdo & Kaul

[57] ABSTRACT

Hydroxyl containing filler reinforced thermoplastic polymers, such as polyolefins, are disclosed having improved physical properties such as impact strength, break strength and flexural modulus. The filler is compatibilized with a thermoplastic polymer containing labile atoms by mixing the two together in the presence of a coupling agent, such as maleic anhydride and a free radical initiator such as a peroxide catalyst. In a preferred embodiment, clay is precoated or encapsulated with polyethylene by mixing the two in the presence of a peroxide catalyst and maleic anhydride and the pretreated filler is then compounded with additional polyethylene. In another preferred embodiment, a filler is encapsulated in a polyolefin having a high melt index and the pretreated filler is then compounded with a polyolefin having a lower melt index.

22 Claims, No Drawings

COMPATIBILIZATION OF HYDROXYL-CONTAINING FILLERS AND THERMOPLASTIC POLYMERS

This application is a continuation-in-part of Application Ser. No. 702,204, filed Feb. 1, 1968, now U.S. Pat. No. 3,645,939.

This invention relates to the compatibilization of thermoplastic polymers with fillers. More particularly, this invention relates to a technique for coupling a polyolefin and an hydroxyl-containing particulate material such as clay, to provide a composition of improved physical properties.

The modification of the physical and mechanical properties of thermoplastic polymers by the addition of a filler is well known in the art. Greater degrees of property improvement result when the filler is uniformly and highly dispersed throughout the polymer matrix and/or when it chemically reacts with the polymer since the polymer-filler interface provides a possible site of weakness in the composite. Various means of improving the compatibility of the filler with the polymer matrix by providing interaction between the filler and the polymer are known in the art. For example, when a cellulosic material, such as wood flour or cotton fibers, is used as a filler in polymers containing methylol groups such as phenolic, urea or melamine resins, a reaction occurs between the methylol groups and the hydroxyl groups on the cellulosic filler. Clay particles have been encapsulated in a polymeric material and the resultant encapsultated particles dispersed in a polyolefin in order to obtain improved properties. In such a system, the polymer used to coat the filler should be chemically bonded to the filler in order to obtain optimum properties such as high strength.

It is an object of this invention to provide an improved technique for compatibilizing particulate fillers with thermoplastic polymers.

It is another object of this invention to provide a two-step process for compatibilizing a hydroxyl containing filler with a thermoplastic polymer whereby the filler is first given a polymer coating to give a powdery product and the precoated filler is then used as a compatible filler for a thermoplastic polymer.

It is another object of this invention to provide a one-step compatibilization process in which a filler is compounded into a matrix thermoplastic polymer with the degree of loading desired in the final composition.

One embodiment of this invention, briefly, comprises providing individual hydroxyl group containing filler particles with a sheath or coating of a thermoplastic polymer. This is accomplished by contacting a thermoplastic polymer containing labile atoms which provide sites for the formation of free radicals and filler particles in the presence of an ethylenically unsaturated carboxylic acid or anhydride under conditions which will generate free radicals on the polyolefin. The acid is thereby coupled onto the thermoplastic polymer and is reacted with the hydroxyl groups on the filler particles by means of esterification and hydrogen bonding. Thus, the ethylenically unsaturated acid acts as a coupling agent between the polymer and the filler. The powdery, resin-coated filler particles which are thereby obtained may then be dispersed in a thermoplastic polymer matrix which may be the same type or a different type as the thermoplastic polymer used to coat the filler particles. Articles molded from the resultant compositions have improved properties (e.g., tensile strength, flexural modulus and impact strength) as compared to compositions prepared in the identical manner except for the omission of the coupling agents. This embodiment is therefore a two-step process for compatibilzing a filler with a matrix polymer.

According to another embodiment of this invention, a hydroxyl group containing filler material is compounded into a matrix thermoplastic polymer having labile atoms which provide sites for the formation of free radicals with the desired degree of loading in the presence of an ethylenically unsaturated carboxylic acid or anhydride under conditions which will generate free radicals on the thermoplastic polymer. Therefore, this embodiment is a one-step process for compatibilizing a filler with a matrix polymer. As in the two-step process previously described, the ethylenically unsaturated carboxylic acid acts as a coupling agent between the polymer and the filler. This process results in an improvement in the processability of the original thermoplastic polymer. Thus, the flow properties of polyethylene may be improved by the incorporation of clay filler in the presence of maleic anhydride and a free radical catalyst such as t-butyl perbenzoate. Preferably, the final composition contains from about 30 to 90% by weight of thermoplastic polymer and from about 5 to 70% by weight of filler.

As used herein, the term "compatibilizing" is intended to include an interaction such as an actual chemical coupling between the hydroxyl group containing filler and the thermoplastic polymer and a physical bonding between the encapsulating thermoplastic polymer and matrix thermoplastic polymer.

The material containing hydroxyl groups used in the practice of this invention may be any of the well known inorganic —OH containing filler materials or reinforcing agents such as siliceous materials (e.g., clay, sand, wollastonite, glass, quartz, diatomaceous earth, mica, silica, asbestos, talc, kaolinite and nepheline syenite); hydrated or partially hydrated metal oxides (e.g., titania, zirconia, vanadia, alumina, chromia, zinc oxide, magnesium oxide and boron oxides); carbonates (e.g., limestone and chalk); etc. The filler material may be either a synthetic or a natural occurring material and, if naturally occurring, may be used in either the purified or unpurified form.

The thermoplastic polymers having labile atoms which provide sites for the formation of free radicals include polymers of olefins (e.g., homopolymers and copolymers of ethylene, propylene, 1-butene, etc.) including copolymers with polar monomers (e.g., ethylene-vinyl acetate copolymers); acrylic resins or elastomers (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polystyrene; copolymers of styrene and other vinyl monomers such as acrylonitrile; vinyl polymers such as homopolymers and copolymers of vinyl acetate, vinyl chloride, alkyl vinyl ether and vinyl butyral; homopolymers and copolymers of dienes such as polybutadiene, polyisoprene, polychloroprene, butadiene-styrene copolymers, isobutylene-isoprene copolymers and other unvulcanized elastomers including natural rubber. Chemical derivatives of such polymers and copolymers of ethylenically unsaturated monomers or dienes (e.g., chlorinated polyethylene, chlorinated polypropylene, chlorinated isoprene copolymers, salts of ethylenemaleic anhydride, ethylene-acrylic acid, ethylene-methacrylic acid, styrene-maleic anhydride, alkyl vinyl ether-maleic anhydride, butadiene-maleic anhydride and isoprene-maleic anhydride copolymers, and completely or partially hydrolyzed ethylenevinyl acetate copolymers) may also be used. Polymers of cyclic monomers may also be used (e.g., homopolymers and copolymers of ethylene oxide, propylene oxide, tetrahydrofuran, propiolactone, caprolactone, caprolactam and ethylene imine). Copolymers of carbon monoxide and sulfur dioxide may also be used (e.g., copolymers of carbon monoxide with ethylene and ethylene imine and copolymers of sulfur dioxide with α-olefins, styrene, vinyl chloride and butadiene). Homopolymers and copolymers of carbonyl compounds may also be used (e.g., homopolymers and copolymers of formaldehyde, acetaldehyde, butyraldehyde, chloral, etc.). Condensation polymers may also be used such as polyesters and alkyd resins which are obtained by the condensation of a polyhydric alcohol and a polycarboxylic acid. Examples of polycarboxylic acids which may be used to form the polyester resin include phthalic acid, phthalic anhydride, succinic acid, adipic acid, isophthalic acid, terephthalic acid, maleic anhydride, etc. The polyhydric alcohols which may be used in the preparation of the polyester or alkyd resin may include the glycols, such as ethylene glycol, propylene glycol, etc. Polyamide resins may also be used (e.g., polymers obtained by the condensation of a polycarboxylic acid such as adipic acid, terephthalc acid and dimer acid with a polyamine such as ethylene diamine, hexamethylene diamine and diethylene triamine). Polyurethanes may also be used (e.g., polymers obtained by reaction of a diisocyanate such as toluene diisocyanate and 4,4'-diphenylmethane diisocyanate with a polyol such as polyethylene oxide, polypropylene oxide, polytetramethylene glycol, hydroxyl-terminated polyesters, hydroxyl-terminated polyisobutylene and hydroxyl-terminated polybutadiene). Other thermoplastic resin based on bisphenol such as polycarbonates, polysulfones and polysulfonates as well as poly-2,5-dimethylphenylene oxide may also be used. Epoxy resins include the condensation products of bisphenol and epichlorohydrin, epoxidized drying oils, the glycidyl ethers of glycerol, epoxylated novolac resins, etc. The thermoplastic resin may be a resin which is capable of being thermoset or cured but which is contacted with the hydroxyl group containing material at temperatures and conditions which will not thermoset or cure the resin. Such resins include silicone resins and elastomers and acrylic resins. The labile atom on the polymer may be, for instance, a hydrogen atom or a halogen atom.

The preferred thermoplastic polymers are polyolefins, including homopolymers and copolymers of olefins such as ethylene, propylene, 1-butene, etc. The olefin monomers from which the polyolefin is formed preferably contain from 2 to 20 carbon atoms. The preferred polyolefin is high density polyethylene. Oxidized polyolefins may also be used.

The ethylenically unsaturated carboxylic acid or anhydride coupling agent used in the practice of this invention is preferably dicarboxylic such as maleic acid, maleic anhydride, fumaric acid, citraconic acid, or itaconic acid. Maleic anhydride is the preferred coupling agent. Monocarboxylic acids, such as acrylic acid and methacrylic acid, may also be used.

Since maleic anhydride has a low melting point and readily sublimes, it is sometimes advantageous to use maleic acid. Maleic acid has a high melting point and little tendency to sublime. Moreover, maleic acid is converted to maleic anhydride at the temperatures at which the compatibilization process is carried out, e.g., temperatures above 100°C., preferably 140° to 160°C. Therefore, maleic anhydride is formed in situ under the processing conditions from maleic acid. Also, poly(maleic anhydride), which is much less volatile than maleic anhydride, may be used. Poly(maleic anhydride) may be prepared, for example, by polymerizing 15 parts by weight of maleic anhydride in 7.5 parts by weight of acetic anhydride at 70°C. for 20 minutes using 5% dicyclohexylperoxydicarbonate as a catalyst.

The means for generating free radicals on the thermoplastic polymer polymer is preferably accomplished by using a free radical catalyst such as a peroxide (e.g., t-butyl perbenzoate, dicumyl peroxide, methylethylketone peroxide, benzoyl peroxide, di-t-butyl peroxide, and 2,5-dimethyl-2,5-di(t-butyl peroxy)hexane). A more detailed compilation of free radical initiators which may be used is set forth at pages II-3 to II-51 of "Polymer Handbook," Interscience Publishers (1966), the disclosure of which is incorporated herein by reference.

The catalyst used is preferably one which will initiate the homopolymerization of maleic anhydride. It is preferred that the catalyst used be one which has a half life of up to about 30 minutes at a temperature between the melting point and the decomposition point of the thermoplastic polymer which is used to coat the filler particles. This temperature will vary according to the particular polyolefin used. A catalyst having a half life of up to about 30 minutes at a temperature of between 100°–120°C. is generally adequate for the purpose of this invention. The term "half life" is intended to mean the length of time required for half of the catalyst to decompose.

Set forth below are a number of catalysts and the half-life of each indicated at various temperatures:

| Catalyst | Temp °C. | Half life Minutes |
|---|---|---|
| 2,5-dimethylhexyl-2,5-di(perbenzoate) | 130 | 18 |
| cyclohexanone peroxide | 130 | 20 |
| t-butyl peracetate | 130 | 24 |
| 1,1-di-t-butyl peroxy-3,3,5-trimethylcylohexane (40%) | 130 | 24 |
| t-butyl di(perphthalate) | 130 | 30 |
| 2,5-dimethyl-2,5-di(t-butyl peroxy)hexane | 150 | 18 |
| bis(α-t-butyl peroxyisopropylbenzene)(40%) | 150 | 6 |
| dicumyl peroxide | 150 | 12 |
| dicumyl peroxide | 170 | 1.5 |
| benzoyl peroxide | 115 | 8.0 |
| benzoyl peroxide | 130 | 1.2 |
| benzoyl peroxide | 135 | 1.0 |
| t-butyl perbenzoate | 130 | 30 |
| t-butyl perbenzoate | 170 | 2 |
| di-t-butyl peroxide | 170 | 9 |
| di-t-butyl peroxide | 180 | 3 |
| 2,4,6-tri-(t-butyl peroxy)triazine | 170 | <1 |
| t-butyl peroxy acid phthalate | 170 | 1 |
| bis-(t-butyl peroxy)diphenylsilane | 170 | 30 |

Preferably, from about 2 to 30% by weight of ethylenically unsaturated carboxylic acid or anhydride and from about 0.5 to 10% by weight of peroxide, based upon the weight of thermoplastic polymer, are used to couple the thermoplastic polymer to the hydroxyl group containing filler. The use of higher amounts of acid or anhydride results in a decrease in impact strength when the precoated filler is combined with a thermoplastic polymer to prepare a composite.

The compatibilized composition may be formed by charging the thermoplastic polymer, the hydroxyl group containing filler, the ethylenically unsaturated carboxylic acid or anhydride and a free radical generating catalyst to a mill and blending the mixture in the mill. In a preferred procedure, the filler and a polyolefin are first blended and maleic anhydride and catalyst are then added and mixing is continued.

In the two-step compatibilization process, it is preferred, although not necessary, that the encapsulating thermoplastic polymer be the same chemical species as the matrix polymer but that the two polymers have different properties. Thus, in order to obtain optimum improvement in physical properties of the composites, the matrix polymer preferably has a lower melt index and a higher molecular weight than the encapsulating polymer. It is also preferred that the matrix polymers have impact strength and other properties superior to those of the encapsulating polymer.

In preparing the thermoplastic polymer encapsulated filler for subsequent use as a precoated filler for the same or a different thermoplastic polymer, the clay should be reacted with sufficient thermoplastic polymer to give a precoated filler comprising from about 30 to 80% by weight of clay and preferably about 70% by weight of clay, the remainder being thermoplastic polymer. In order to insure homogeneity of the thermoplastic polymer coating on the filler, a thermoplastic polymer having good wetting and flow properties should be used. Therefore, it is preferred to use a thermoplastic polymer having a melt index of from 5 to 50 as the encapsulating thermoplastic polymer.

The thermoplastic polymer encapsulated filler is mixed with sufficient thermoplastic polymer to yield a final composition containing from 5 to 70% by weight of clay and preferably from about 30 to 50% by weight of clay. The resultant composition has mechanical properties such as tensile strength, flexural modulus and impact strength superior to those of uncompatibilized compositions containing the same amount of clay as well as those of unfilled thermoplastic polymer. The normally inert filler is thus converted to a reinforcing agent.

When a thermoplastic polymer and a mineral filler containing hydroxyl groups are contacted with, for example, maleic anhydride and a free radical catalyst, the maleic anhydride simultaneously or consecutively adducts or reacts with the thermoplastic polymer and esterifies and forms hydrogen bonds with the filler containing hydroxyl groups. Thus, the maleic anhydride links the thermoplastic polymer and filler together. When polyethylene is used as the thermoplastic polymer and clay as the filler containing hydroxyl groups, the polyethylene and clay are linked together by means of the maleic anhydride forming a block copolymer containing a succinic half acid ester bridge between clay and polyethylene segments. The polyethylene becomes, in this manner, a side chain of the clay. The reaction which occurs may be represented as follows:

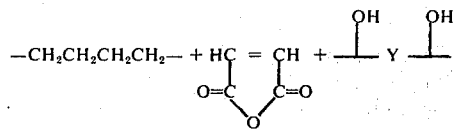

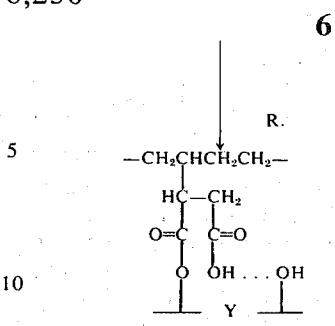

wherein R. represents the free radical from the catalyst and Y is the residue of a clay molecule. The segment of the block copolymer derived from the maleic anhydride may be polymeric, e.g., polymaleic anhydride, in lieu of or in addition to the single unit shown in the equation.

It is essential that the thermoplastic polymer, the filler containing hydroxyl groups and the ethylenically unsaturated carboxylic acid or anhydride be contacted so that reaction may occur between the acid and the other two materials substantially simultaneously. If clay, for example, is first reacted with maleic anhydride to form a clay maleate half ester, the half ester will not subsequently readily react with polyethylene even in the presence of a free radical catalyst. Moreover, if it is attempted to react polyethylene with maleic anhydride at 150°C. in a reaction chamber which is not sealed, reaction does not readily occur in the presence of free radical catalyst and the maleic anhydride sublimes out of the reaction chamber, whereas, when clay is present, sublimation of the maleic anhydride is prevented or minimized and reaction occurs. The coupling reaction between the thermoplastic polymer and the hydroxyl containing filler proceeds most conveniently if all constituents are present together.

The homogeneous composites of this invention may be molded into articles by conventional injection molding, compression molding or transfer molding techniques. They may be formed into sheets or films or used as laminating layers. When the hydroxyl group containing material is sand, the composite may be formed into sheets of sand paper in which the sand is integrally bonded.

When the homogeneous composites of this invention are formed into sheets or films, the latter may be subjected to subsequent mechanical treatment such as uniaxial or biaxial stretching to enhance the strength. When the hydroxyl group containing filler is fibrous, such as asbestos, the stretching operation will aid in the alignment of the fibers further enhancing the strength of the sheet or film.

In the examples which follow, all parts are by weight unless otherwise specified. Examples 1 to 20 and 26 to 32 illustrate the two-step technique described above and Examples 21 to 25 illustrate the one-step compatibilization technique.

EXAMPLE 1

The following materials are mixed in a Brabender Plasticorder mixer at 130° C. for 20 minutes:

| Material | Amount Parts by Weight |
| --- | --- |
| Low density polyethylene | 10 |
| Beater clay | 90 |
| Dicumyl peroxide | 1.7 |

| Material | Amount Parts by Weight |
| --- | --- |
| Maleic anhydride | 3.4 |

In charging these materials to the mixer, the clay, maleic anhydride and dicumyl peroxide are added first, followed by addition of the polyethylene. The product obtained following mixing is a fine powder comprising polyethylene coated on and chemically bonded to clay particles.

The pretreated clay thus obtained is blended with various amounts of polyethylene in a Brabender Plasticorder at 150° for 20 minutes to yield products containing, respectively, 30% and 50% clay, based on the total weight of the composition. The resultant compositions are molded into 20 mil films at 320° F. under 40,000 pounds ram pressure for 5 minutes. The resultant films have a smooth surface as contrasted to the coarse surface of a film prepared as described above except for the omission of maleic anhydride in the clay pretreating step.

The breaking strength of polyethylene compositions filled with pretreated clay as described above decreases as the clay level is increased to 30% by weight and then increases to the level of unfilled polyethylene when the clay level is increased to 50% by weight. The yield strength of such compositions increases and the ultimate elongation decreases as the amount of clay is increased.

EXAMPLE 2

To a Brabender Plasticorder there are charged 10 parts of low density polyethylene and 90 parts of clay (Hydrite 10 which is hydrated kaolin with a median particle size of 0.55 microns and a pH of 4.5–5.5 which has been dried at 150° C. for 24 hours in vacuo before use). The composition is mixed for 10 minutes and there are then added 2.0 parts of maleic anhydride and 0.5 part of t-butyl perbenzoate. The composition is mixed at 150° C. for 15 minutes. The pretreated clay thus obtained is mixed at 130° C. with sufficient low density polyethylene to give a filled composition comprising 70 parts of polyethylene and 30 parts of clay. The resultant composition has better tensile yield and break properties and elongation than does a composition prepared in the same manner but omitting the t-butyl perbenzoate and maleic anhydride.

The following examples illustrate the effect of varying the amount of clay in the polyolefin encapsulated clay filler:

EXAMPLES 3–4

The precoating process described in Example 2 is repeated substituting high density polyethylene for low density polyethylene to prepare two samples of precoated clay, one sample containing 90% clay and 10% high density polyethylene and the other sample containing 70% clay and 30% high density polyethylene. Each sample of pretreated clay thus obtained is mixed at 150° C. with sufficient high density polyethylene to give a composition comprising 70 parts of polyethylene and 30 parts of clay. Testing by standard procedures shows that the composite prepared from the pretreated clay containing 70% clay gives better tensile properties, including improved yield strength than the composite obtained from the filler containing 90% clay.

The following example illustrates the use of poly(maleic anhydride) instead of maleic anhydride.

EXAMPLE 5

A mixture of 90 parts of Hydrite 10 clay and 10 parts of high density polyethylene are mixed as described in Example 2 in the presence of 20% of poly(maleic anhydride), having a specific viscosity in methyl ethyl ketone at 25° C. of 0.945, and 5% of t-butyl perbenzoate, the percentages being based on the weight of polyethylene. The precoated clay is then mixed with additional high density polyethylene at 150° C. in the presence of 2% of t-butyl perbenzoate, based on the weight of additional polyethylene, to give a composition comprising 70% polyethylene and 30% clay. The resultant composition has good tensile strength.

The following example illustrates the substitution of maleic acid for maleic anhydride.

EXAMPLE 6

A mixture of 70 parts of Hydrite 10 clay and 30 parts of high density polyethylene are premixed in the presence of 20% maleic acid and 5% t-butyl perbenzoate, percentages being based upon the weight of the polyethylene, for 10 minutes at 150° C. The polyethylene encapsulated clay particles are then mixed at 150° C. for 10 minutes with additional high density polyethylene to form a composition comprising 50% polyethylene and 50% clay. The resultant compatibilized composite has good tensile strength, flexural modulus and impact strength.

The following examples illustrate the effect of varying the amount of clay in the final composite:

EXAMPLES 7–10

A high density polyethylene encapsulated clay composition comprising 70% clay and 30% polyethylene is prepared as described in Examples 3–4. A series of filled polyethylene compositions containing varying amounts of clay are prepared by mixing at 150° C. for 10 minutes sufficient of the precoated clay with additional high density polyethylene to give final compositions containing, respectively, 20% clay, 30% clay, 50% clay, and 70% clay, the remainder in each composition being high density polyethylene. An identical set of control compositions is prepared except that in the polyethylene pretreatment of the clay, the maleic anhydride and t-butyl perbenzoate are omitted. These compositions are tested according to standard procedures. It is found that all control samples containing untreated clay had no yield strength and the break strength was almost constant, independent of the amount of clay present. The control sample containing 70% of clay has such poor flow properties that a continuous film for testing cannot be obtained. The samples containing pretreated clay in accordance with this invention give considerably improved yield and break strength. As the amount of clay in the final composition is increased, the yield and break strengths of the treated samples increase up to a maximum value at 50% clay. The impact strength of the compatibilized composition containing 30% clay was improved 30% over the corresponding control and the impact strength of the compatibilized composition containing 50% clay was improved 250% over the corresponding control.

The following examples illustrate the improved properties which result from the use of a high melt index polyethylene as the coating or encapsulating material in the coupling reaction of the clay followed by compounding with a low melt index matrix polyethylene.

EXAMPLES 11–14

A series of compatibilized high density polyethylene-clay compositions are prepared by pretreating clay and compounding it with additional polyethylene as described in Example 6. The pretreated clay comprises 70% clay and 30% polyethylene. The pretreated clay is compounded with polyethylenes having varying properties in amounts sufficient to give samples containing 50% clay-50% polyethylene and 30% clay-70% polyethylene. The former composition contains 21% encapsulating polyethylene and 29% matrix polyethylene and the latter composition contains 13% encapsulating polyethylene and 57% matrix polyethylene. Set forth below are the melt indices of both the encapsulating polyethylene and the matrix polyethylene used in each example. An identical set of control compositions are also prepared except that in the polyethylene treatment of the clay, the maleic anhydride and t-butyl perbenzoate are omitted.

| Example | Melt Index of Encapsulating Polyethylene | Melt Index of Matrix Polyethylene |
|---|---|---|
| 11 | 0.7 | 0.7 |
| 12 | 15.0 | 0.7 |
| 13 | 22.0 | 0.7 |
| 14 | 15.0 | 15.0 |

The impact strength of each of the samples made in Examples 11–14 are compared to the corresponding control and the percent improvement calculated. The results are set forth in the following table. In this table, the designation "50/50" refers to the final sample containing 50% clay and 50% high density polyethylene and the designation "70/30" refers to the final composition containing 70% polyethylene and 30% clay. It will be noted that those examples wherein the encapsulating polyethylene has a higher melt index than the matrix polyethylene result in compositions having much higher impact strength than when the matrix polyethylene and the encapsulating polyethylene are the same.

PER CENT IMPROVEMENT OVER CORRESPONDING UNCOUPLED CONTROL

| Example | | Izod Impact |
|---|---|---|
| 11 | 50/50 | 245 |
|    | 70/30 | 25 |
| 12 | 50/50 | 595 |
|    | 70/30 | 260 |
| 13 | 50/50 | 715 |
|    | 70/30 | 515 |
| 14 | 50/50 | 120 |
|    | 70/30 | 50 |

The following example illustrates the use of asbestos as the hydroxyl group containing filler.

EXAMPLE 15

Asbestos fibers having a pH of 9.5 are dried at 150° C. for 24 hours. A mixture comprising 35 parts of asbestos and 15 parts of high density polyethylene having a melt index of 22.0 is mixed in a Brabender Plasticorder at 150° C. for 10 minutes in the presence of 20% maleic anhydride and 5% t-butyl perbenzoate, the percentages being based upon the polyethylene. The polyethylene coated filler is then blended with high density polyethylene having a melt index of 0.5 at 150° C. for 10 minutes to make up a composition comprising 50% polyethylene and 50% asbestos. The resultant composition has better break strength and impact strength than does a composition made up in the same manner except omitting the maleic anhydride and t-butyl perbenzoate from the pretreatment step.

The following examples illustrate the use of polypropylene as the polyolefin.

EXAMPLE 16

A mixture of 70 parts of Hydrite 10 clay and 30 parts of isotactic polypropylene having a melt index of 15.0 is mixed in the presence of 20% maleic anhydride and 5% t-butyl perbenzoate, the percentages being based upon the weight of the polypropylene, at 170° C. for 20 minutes. The pretreated clay is then mixed with sufficient polypropylene having a melt index of 4.0 to give a composite comprising 70% total polypropylene and 30% clay. The resultant composition has considerably better break strength, elongation, flexural modulus and impact strength than does a control composition prepared in the same manner but omitting the peroxide and maleic anhydride.

EXAMPLE 17

The process of Example 16 is repeated substituting bis-(t-butyl peroxy)diphenyl silane for the t-butyl perbenzoate. The resultant composite has good yield, break and impact strengths, elongation and flexural modulus.

The following example illustrates the use of calcium carbonate as the mineral filler in this invention.

EXAMPLE 18

A mixture of 70 parts of calcium carbonate and 30 parts of high density polyethylene having a melt index of 15.0 are premixed in the presence of 20% of maleic anhydride and 0.56% of t-butyl perbenzoate at 150° C. for 10 minutes. The premix is compounded at 150° C. for 10 minutes with sufficient polyethylene having a melt index of 0.7 to give a composite comprising 50% total polyethylene and 50% calcium carbonate. The impact strength of the compatibilized composition is improved 440% and the break strength is improved 53% over a corresponding control which has been prepared in the same manner but omitting the peroxide catalyst and the maleic anhydride in the pretreatment step.

EXAMPLE 19

The process of Example 18 is repeated substituting for the calcium carbonate a slurry which is a waste product from paper coating containing clay, calcium carbonate, casein and titanium dioxide. The final composite has a 120% improvement in impact strength and a 54% improvement in break strength over the control.

The following example shows the use of asbestos as the filler material and polypropylene as the polyolefin.

EXAMPLE 20

A mixture of 70 parts of chrysolite asbestos and 30 parts of isotactic polypropylene having a melt index of 15.0 is mixed for 6–8 minutes at 170° C. in the presence of 20% maleic anhydride and 5% t-butyl perbenzoate, the percentages being by weight of the polypropylene. The premix is then compounded with fresh polypropylene having a melt index of 4.0 in an amount sufficient to give a final composition comprising 50% asbestos and 50% polypropylene. The compounding step is carried out at 170° C. for 10 minutes. The physical properties of the resultant composite are considerably improved over a control prepared in the same manner but omitting the peroxide and maleic anhydride in the pretreatment.

EXAMPLE 21

The following materials are mixed in a Brabender Plasticorder at 130° C. for 15 minutes:

| Material | Amount |
| --- | --- |
| Clay | 50.0% |
| Polyethylene | 46.4% |
| Maleic Anhydride | 2.4% |
| Dicumyl Peroxide | 1.2% |

In mixing these ingredients, ⅓ of the clay is charged to the mixing chamber, followed by ⅓ of the maleic anhydride-peroxide mixture and ⅓ of the polyethylene, followed by the same procedure twice repeated. In this manner, the clay adsorbs the maleic anhydride and subsequent reaction with the polyethylene readily occurs under the influence of the peroxide catalyst. When the polyethylene and maleic anhydride are mixed in the absence of the clay, the anhydride tends to sublime out of the heated mixing chamber. The compatibilized mixture may be processed in a manner usual for filled or unfilled thermoplastic resins, e.g., extruded into film or pipe, compression molded into shaped objects, injection molded, etc.

EXAMPLES 22–23

The process of Example 21 is repeated using varying amounts of materials as indicated in Table 3. Films 5 mil thick are molded from the compatibilized mixture obtained in each example and the water vapor transmission (WVT) is determined according to ASTM E96-63T. The results shown in Table 3 indicate that the practice of this invention results in decreased permeability.

TABLE 3

| Example | Polyethylene % | Clay % | TiO$_2$ % | Maleic Anhydride/Dicumyl Peroxide % | WVT,g/m.$^2$/24 hr. |
| --- | --- | --- | --- | --- | --- |
| Control | 100 | 0 | 0 | 0 | 21.0 |
| Control | 85.7 | 0 | 0 | 9.5/4.8 | 7.5 |
| 19 | 47.0 | 45 | 5 | 2.0/1.0 | 10.6 |
| 20 | 57.6 | 35 | 5 | 1.6/0.8 | 8.0 |

EXAMPLE 24

In a Brabender Plasticorder there are mixed 70 parts of low density polyethylene having a melt index of 2, 30 parts of bentonite clay, 2 parts of maleic anhydride and 0.5 part of dicumyl peroxide. Mixing is continued at 150° C. for 20 minutes. A film 20 mils in thickness is prepared and tensile properties are determined. The composition is found to have higher yield strength and break strength than a corresponding composite prepared in the same manner but omitting the maleic anhydride and peroxide.

EXAMPLE 25

A mixture of 80 parts of asbestos, 2.4 parts of maleic anhydride, 1.2 parts of dicumyl peroxide and 16.4 parts of low density polyethylene are blended for 20 minutes at about 150°C. The composite is molded into a 1.8 inch thick sheet. The coupled molding is harder, stiffer, smoother, more homogeneous, has better flow and sands more smoothly than a corresponding uncoupled control sheet. The coupled molding is also much denser and has a higher hardness than an uncoupled control.

The following example illustrates the improved properties obtained by using the process of this invention in comparison to virgin polyethylene and to composites without the use of a catalyst, coupling agent or both:

EXAMPLE 26

Thirty parts of high density polyethylene (Fortiflex A60-70R having a melt index of 0.7) are mixed with 70 parts of clay (Hydrite 10) for 10 minutes at 150°C. in a Brabender Plasticorder (roller head No. 6 at 75 rpm). Six parts of coupling agent (maleic acid and 1.5 parts of catalyst (t-butyl perbenzoate) are added and the mixing is continued for an additional 10 minutes. The resultant concentrate is then further blended with 40 parts of additional polyethylene to give a final composite with a 50/50 polyethylene/clay ratio. Table 4 shows physical properties of the composition (Sample E) and illustrates the improvements in mechanical properties obtained by this process in comparison to virgin polyethylene — i.e., polyethylene to which no clay, coupling agent or catalyst has been added (Sample A) and to polyethylene/clay composites prepared as described above, but with the omission of: catalyst and coupling agent (Sample B), coupling agent (Sample C) and catalyst (Sample D).

TABLE 4

| SAMPLE | DESCRIPTION | TENSILE[1] | | | FLEXURAL MODULUS[2] psi | IZOD IMPACT[3] ft.-lb./in. NOTCH |
| --- | --- | --- | --- | --- | --- | --- |
| | | Yield psi | Break psi | Elongation % | | |
| A | Virgin Polyethylene | 4410 | 4070 | 750 | 201,000 | 2.1 |
| B | Polyethylene/Clay (no catalyst or coupling agent) | none | 4040 | 2 | 447,000 | 0.3 |
| C | Polyethylene/Clay + catalyst (no coupling agent) | none | 4430 | 2 | 432,000 | 0.4 |

TABLE 4-continued

| SAMPLE | DESCRIPTION | TENSILE[1] | | | FLEXURAL MODULUS[2] psi | IZOD IMPACT[3] ft.-lb./in. NOTCH |
|---|---|---|---|---|---|---|
| | | Yield psi | Break psi | Elongation % | | |
| D | Polyethylene/Clay + coupling agent (no catalyst) | none | 4780 | 3 | 434,000 | 0.5 |
| E | Compatibilized Polyethylene/ Clay | none | 5160 | 3 | 499,000 | 2.8 |

[1]Tensile characteristics by ASTM D882-64T
[2]Flexural Modulus by ASTM D790-66
[3]Izod Impact strength by ASTM D256-56

The following examples illustrate the improvements obtained when the two step process is utilized with a combination of high melt index coating polymer and low melt index matrix polymer:

EXAMPLE 27

Thirty parts of a high melt index, high density polyethylene (Fortiflex A60-1500N having a melt index of 15) are mixed with 70 parts of clay (Hydrite 10) for 10 minutes at 150°C. in a Brabender Plasticorder (roller head No. 6 at 75 rpm). Six parts of coupling agent (maleic anhydride) and 1.5 parts of catalyst (t-butyl perbenzoate) are added and the mixing is continued for an additional 10 minutes. The resultant encapsulated clay is then further blended with the required amount of a low melt index, high density polyethylene (Fortiflex A60-70R having a melt index of 0.7) to give a final composite with the desired polyethylene/clay ratio. Thus, 133 parts of low melt index polyethylene are added to produce a 70/30 composite, while 40 parts are used to produce a 50/50 composite. Table 5 shows physical properties of the final compositions (Samples D and F) and illustrates the improvements in mechanical properties obtained by this process in comparison to the unfilled blends of the same polyethylenes used (Samples A and B) as well as two uncompatibilized polyethylene/clay composites (Samples C and E) processed in the same manner as Samples D and F except that the coupling agent and catalyst are omitted.

EXAMPLE 28

The process described in Example 27, Sample F is followed with the exception that a two-roll mill (6½ × 12, friction ratio 1.2, and speed of 20 rpm) is used instead of the Brabender Plasticorder and maleic acid is used instead of maleic anhydride as the coupling agent. In this manner a compatibilized 50/50 polyethylene/clay composite is prepared having the following properties:

| | |
|---|---|
| Tensile Yield Strength: | 5200 psi |
| Tensile Breaking Strength: | 5180 psi |
| Tensile Elongation: | 8% |
| Flexural Modulus: | 365,000 psi |
| Izod Impact: | 5.2 ft.-lb./in. notch |

EXAMPLE 29

The process described above in Example 27 is repeated with the exception that Grex DA60-220 (M.I. = 22) is used as the high melt index, high density polyethylene and Super Dylan 7004-2 (M.I. = 0.5) is used as the low melt index, high density polyethylene. The properties of these compositions (Samples B and D) are set forth in Table 6 and compared to uncompatibilized polyethylene/clay composites (Sample A and C) processed in the same manner as Samples B and D except for the omission of catalyst and coupling agent.

TABLE 5

| SAMPLE | DESCRIPTION | TENSILE[1] | | | FLEXURAL MODULUS[2] psi | IZOD IMPACT[3] ft.-lb./in. NOTCH |
|---|---|---|---|---|---|---|
| | | Yield psi | Break psi | Elongation % | | |
| A | Virgin Polyethylene* | 3820 | 2440 | 140 | 190,000 | 2.0 |
| B | Virgin Polyethylene** | 4010 | 2350 | 63 | 219,000 | 1.4 |
| C | Polyethylene*/Clay 70/30 (no catalyst or coupling agent) | none | 4230 | 4 | 324,000 | 0.9 |
| D | Compatibilized Polyethylene*/ Clay 70/30 | 4780 | 3830 | 25 | 349,000 | 3.1 |
| E | Polyethylene**/Clay 50/50 (no catalyst or coupling agent) | none | 2630 | 2 | 446,000 | 0.6 |
| F | Compatibilized Polyethylene**/ Clay 50/50 | none | 5140 | 5 | 307,000 | 4.9 |

*Fortiflex A60-1500N plus Fortiflex A60-70R in a 30:133 ratio
**Fortiflex A60-1500N plus Fortiflex A60-70R in a 30:40 ratio
[1]Tensile characteristics by ASTM D882-64T
[2]Flexural Modulus by ASTM D790-66
[3]Izod Impact strength by ASTM D256-56

TABLE 6

| SAMPLE | DESCRIPTION | TENSILE[1] | | | FLEXURAL MODULUS[2] psi | IZOD IMPACT[3] ft.-lb./in. NOTCH |
|---|---|---|---|---|---|---|
| | | Yield psi | Break psi | Elongation % | | |
| A | Polyethylene*/Clay 70/30 (no coupling agent or catalyst | 4820 | 4900 | 6 | 306,000 | 1.1 |
| B | Compatibilized Polyethylene*/ Clay 70/30 | 4710 | 3510 | 31 | 278,000 | 4.1 |
| C | Polyethylene**/Clay 50/50 (no coupling agent or catalyst | none | 4860 | 4 | 453,000 | 1.7 |
| D | Compatibilized Polyethylene**/ Clay 50/50 | 5000 | 4960 | 9 | 406,000 | 4.3 |

*Grex DA60-220 plus Super Dylan 7004-2 in a 30:133 ratio
**Grex DA60-220 plus Super Dylan 7004-2 in a 30:40 ratio
[1]Tensile characteristics by ASTM D882-64T
[2]Flexural Modulus by ASTM D790-66
[3]Izod Impact strength by ASTM D256-56

The following example illustrates a comparison between the compatibilized compositions of this invention and carboxylated polymers containing fillers:

EXAMPLE 30

Thirty parts of high melt index, high density polyethylene (Fortiflex A60-1500N) are mixed with 70 parts of clay (Hydrite 10) for 10 minutes at 150°C. in a Brabender Plasticorder in the presence of 20 parts of maleic anhydride and 5 parts of t-butyl perbenzoate. The resultant coated clay is then blended with low melt index, high density polyethylene (Fortiflex A60-70R) at 150°C. for 10 minutes to yield a composite comprising 60% total polyethylene and 40% clay. Table 7 shows the physical properties of the final composition (Sample A).

For purpose of comparison, carboxylated polyethylene and ethylene copolymers containing carboxyl groups (Zetafax QX 3623.7, an ethylene-acrylic acid graft copolymer having a melt index of 5; Surlyn A 1650, an ethylene-acrylic acid copolymer containing zinc ions; and DQDA 2300, a carboxylated polyethylene having a melt index of 7) are substituted for the Fortiflex A60-1500N polyethylene in the above process except that the coupling agent and catalyst are omitted. The carboxylated ethylene polymer treated clay is blended with Fortiflex A60-70R polyethylene as described above. The properties of these compositions are set forth in Table 7. The results indicate that the composite prepared by the maleic acid-peroxide coupling technique gives superior physical properties.

The following example illustrates the use of a copolymer of butylacrylate and acrylonitrile in the process of this invention:

EXAMPLE 31

Thirty parts of an acrylic elastomer obtained by the copolymerization of butyl acrylate and acrylonitrile is charged into a Brabender Plasticorder set at 150°C. Seventy parts of clay (Hydrite 10) is added and the composition is mixed at a 150°C. for 10 minutes. Thirty parts of the clay-polymer premix and 12.0 parts of additional acrylic copolymer are blended for 10 minutes in the mixer at 150°C. to yield a composite containing 50% acrylic elastomer and 50% clay.

In the manner described in the preceding paragraph, 18.6 parts of the same acrylic elastomer and 43.4 parts of clay are blended in a Brabender Plasticorder at 150°C. There are then added 3.72 parts of maleic anhydride and 0.93 parts of t-butyl perbenzoate and the composition is blended for 10 minutes at 150°C. This premix, comprising 70% clay and 30% acrylic elastomer, is blended with 11.1 parts of additional acrylic elastomer for 10 minutes at 150°C. to yield a compatibilized composite comprising 50% acrylic elastomer and 50% clay.

A comparison of the mechanical properties of the uncompatibilized composite prepared as described in paragraph 1 and the compatibilized composite prepared as described in paragraph 2 show that the properties of the compatibilized composite are superior to those of the uncompatibilized composite. The results are as follows:

TABLE 7

| SAMPLE | DESCRIPTION Clay-Coating Polymer | TENSILE | | | FLEXURAL MODULUS psi | IZOD IMPACT ft.-lb./in. NOTCH |
|---|---|---|---|---|---|---|
| | | Yield psi | Break psi | Elongation % | | |
| A | Fortiflex A60-1500N | 4940 | 4910 | 7 | 289,000 | 3.90 |
| B | Zetafax QX 3623.7 | — | 3900 | 12 | 234,000 | 1.20 |
| C | Surlyn A 1650 | — | 4100 | 9 | 257,000 | 0.78 |
| D | DQDA 2300 | — | 3860 | 9 | 257,00 | 1.03 |

|  | UNCOMPATIBILIZED COMPOSITE | COMPATIBILIZED COMPOSITE |
|---|---|---|
| Tensile Strength, psi | | |
| Yield | 221 | 318 |
| Break | 95 | 163 |
| Elongation, % | 1090 | 940 |
| Flexural Modulus, psi | 320 | 350 |

EXAMPLE 32

When the process described in Example 1 is repeated substituting for the polyethylene equivalent amounts of, respectively, a copolymer of ethylene and ethylacrylate; polystyrene; polybutadiene; a hydrolyzed ethylene-vinyl acetate copolymer originally containing 18% vinyl acetate; a polyamide obtained by the condensation of terephthalic acid and ethylene diamine; a polyurethane obtained by the reaction of toluene diisocyanate and polyethylene glycol; and an epoxy resin obtained by the condensation of Bisphenol-A and epichlohydrin, compatibilized clay composites are obtained.

I claim:

1. A process for preparing a compatibilized, filled polyolefin composition comprising encapsulating hydroxyl group containing filler particles with a coating of a polyolefin by mixing said filler particles and said polyolefin and thereafter mixing with maleic anhydride or poly(maleic anhydride) and a free radical catalyst under conditions which will generate free radicals on the polyolefin, whereby said polyolefin coating is coupled to said filler, and said polyolefin coated filler particles are thereafter dispersed in a polyolefin matrix, said composition being thermoplastic.

2. A process for preparing a compatibilized, filled polyolefin composition comprising encapsulating hydroxyl group containing filler particles with a coating of a polyolefin by mixing said filler particles and said polyolefin and thereafter mixing with maleic anhydride or poly(maleic anhydride) and a free radical catalyst under conditions which will generate free radicals on the polyolefin, whereby said polyolefin coating is coupled to said filler, said composition being thermoplastic.

3. A process as defined in claim 2 wherein said free radical catalyst is a peroxide compound which will initiate the homopolymerization of maleic anhydride.

4. A process as defined in claim 2 wherein said free radical catalyst is a peroxide compound which has a half-life of up to about 30 minutes at the temperature at which said mixing occurs.

5. A process according to claim 2 wherein said polyolefin is polyethylene or isotactic polypropylene.

6. A process as defined in claim 2 wherein said filler material is clay.

7. A process as defined in claim 2 wherein said filler material and said polyolefin are mixed with from about 2 to 30% by weight of maleic anhydride and from about 0.5 to 10% by weight of a peroxide catalyst.

8. A process as defined in claim 1 wherein said free radical catalyst is a peroxide compound which will initiate the homopolymerization of maleic anhydride.

9. A process as defined in claim 1 wherein said free radical catalyst is a peroxide compound which has a half life of up to about 30 minutes at the temperature at which said mixing occurs.

10. A process as defined in claim 9 wherein said maleic anhydride is formed in situ by heating maleic acid to a temperature above 100°C.

11. A process as defined in claim 8 wherein said filler material is clay.

12. A process according to claim 8 wherein said polyolefin is high density polyethylene.

13. A process as defined in claim 8 wherein said filler material and said polyolefin are mixed with from about 2 to 30% by weight of maleic anhydride and from about 0.5 to 10% by weight of a peroxide catalyst.

14. A process as defined in claim 8 wherein said encapsulating polyolefin and said matrix polyolefin are the same chemical species.

15. A process as defined in claim 14 wherein said matrix polyolefin has a lower melt index than that of said encapsulating polyolefin.

16. A process as described in claim 15 wherein said encapsulating polyolefin has a melt index of from 5 to 50.

17. A process as described in claim 11 wherein said polyolefin coated filler particles comprise about 30 to 80% by weight of clay, the remainder being polyolefin.

18. A process as described in claim 11 wherein said polyolefin coated filler particles are mixed with sufficient matrix polyolefin to yield a final composition containing from 5 to 70% by weight of clay, the remainder being polyolefin.

19. A process as defined in claim 2 wherein said hydroxyl group containing filler is a siliceous material.

20. A process as defined in claim 2 wherein said hydroxyl group containing filler is a carbonate.

21. A process as defined in claim 1 wherein said filler material is glass.

22. A process as defined in claim 2 wherein said filler material is glass.

* * * * *